2,042,860

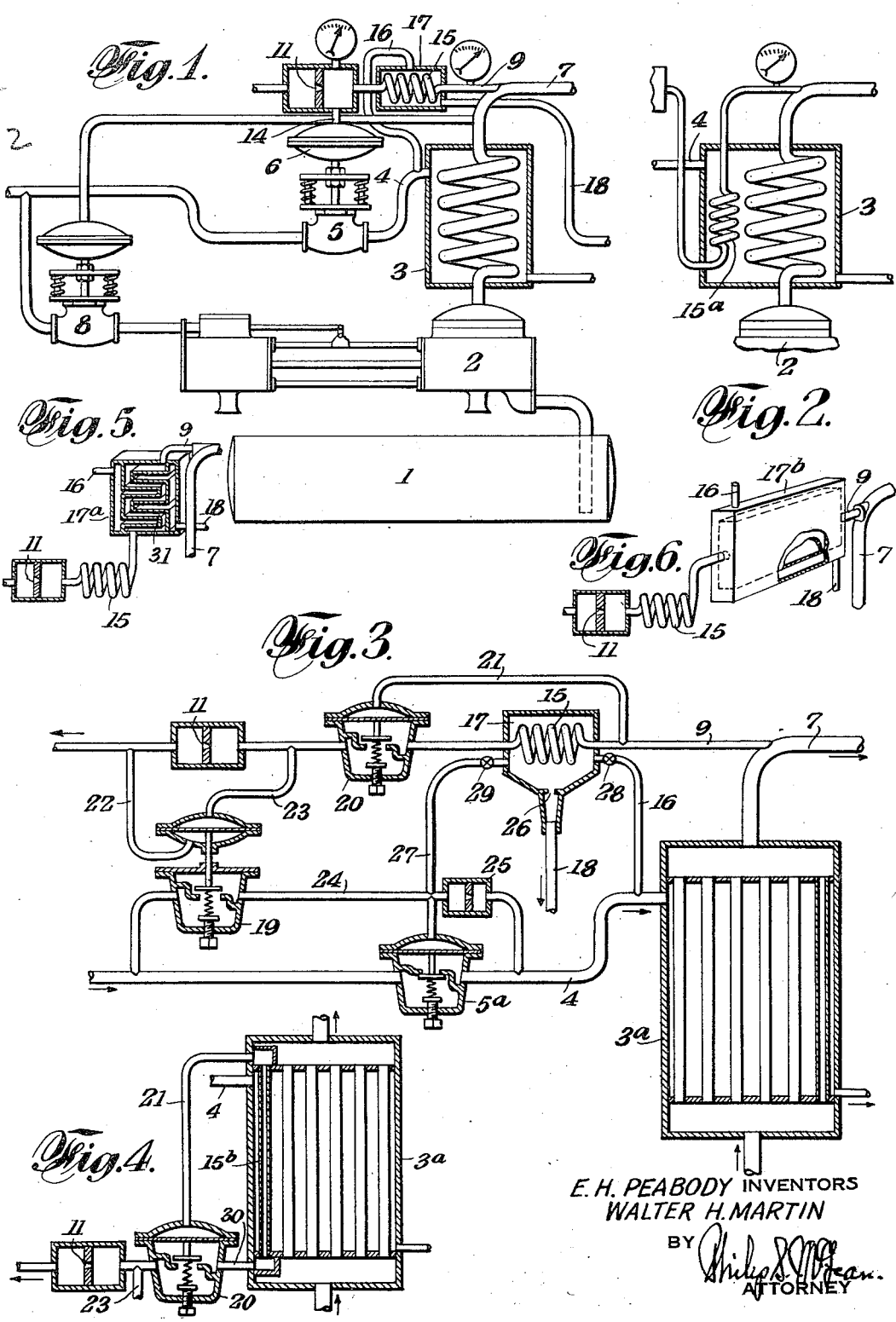
June 2, 1936. E. H. PEABODY ET AL 2,042,860
METHOD AND APPARATUS FOR THE REGULATION OF VISCOSITY OF LIQUIDS
Filed Aug. 30, 1933
E. H. PEABODY
WALTER H. MARTIN
INVENTORS
BY ATTORNEY Patented June 2, 1936

UNITED STATES PATENT OFFICE 2,042,860

METHOD AND APPARATUS FOR THE REGULATION OF VISCOSITY OF LIQUIDS

Ernest H. Peabody, New York, and Walter H. Martin, Mount Vernon, N. Y., assignors to Peabody Engineering Corporation, New York, N. Y., a corporation of New York Application August 30, 1933, Serial No. 687,458

9 Claims. (Cl. 137—78)

This invention relates to improvements in methods and apparatus for the regulation of viscosity of liquids.

Previously, in the viscosity regulator art, it has been the practice to control and regulate the viscosity of a liquid by a heater or heat exchanger and to pass the liquid leaving the heater through a viscosity responsive device, utilizing changes in viscosity detected by said device to regulate the supply of heating medium to the heater to thereby bring the liquid to the desired viscosity.

With certain installations a relatively large quantity of liquid has to be supplied to the heat exchanger and accordingly a considerable time is required to effect proper heat exchange to vary or regulate the viscosity as desired. Accordingly with previous systems, there has been a lag in the viscosity control which frequently brought about conditions in which undesired fluctuations of viscosity occurred. In other cases the regulators tended to effect their control upon the heating medium in a comparatively abrupt manner with attendant extreme variations of the viscosity of the liquid passing through the heater.

The present invention has for one of its objects the provision of an improved means and method for effecting viscosity regulation wherein improved results over previous systems may be attained.

A further object of the present invention resides in the provision of improved means and methods of viscosity regulation wherein fluctuations in viscosity, due to lag in control may be substantially avoided.

A further object of the present invention resides in the provision of a method and means for effecting viscosity regulation and control wherein the control will be effective in advance of the ultimate change of viscosity of the main body of liquid which is to pass through the main heat exchanger.

A further object of the present invention resides in the provision of an improved method and means for regulating the viscosity of liquids wherein improved operation is secured by effecting heat interchange directly with the liquid passing through the viscosity change detecting device.

A further object of the present invention resides in the improved method and means for viscosity regulation and control wherein provision is made for rapidly imparting heat to a relatively small mass or quantity of liquid passing through the viscosity detecting device itself and during its passage therethrough to secure improved results in desired viscosity regulation.

Further and other objects of the present invention will be hereinafter set forth in the accompanying specification and claims and shown in the drawing which shows by way of illustration a preferred embodiment and the principle thereof and what is now considered to be the best mode contemplated of applying that principle. Other embodiments of the invention employing the same or equivalent principle may be used and structural changes made as desired by those skilled in the art without departing from the present invention and within the spirit of the appended claims. In the drawing:

Figure 1 is a diagrammatic view of one embodiment of viscosity regulator with the present improvements incorporated therein;

Figure 2 is a fragmentary view of a modification;

Figure 3 is a diagrammatic view of another type of viscosity regulator with the present improvements incorporated therein;

Figure 4 is a fragmentary view of a modification of the regulator shown in Figure 3;

Figures 5 and 6 are fragmentary views of other modifications.

Referring first to Figure 1 which generally shows the improvements of the present invention incorporated with the viscosity regulator shown and described in the Leask and Warner Patent No. 1,881,200, dated October 4, 1932. In this view I designates a storage tank from which the liquid is withdrawn by a pump 2 and delivered through a heater 3 of any suitable type, which may be supplied with a heating medium, preferably steam, through a pipe 4 having a valve 5 controlled by a pressure regulator 6. After leaving the heater the liquid passes through pipe 7 to its point of use, for example, to fuel burners not shown. The pump 2 is controlled by a pump governor 8 of the ordinary type designed so that the liquid will leave the heater 3 at a constant pressure. At the outlet of the heater there is a sampling pipe 9 through which a small portion of the liquid is delivered to a viscosity change detecting or sensitive device in the form of a small tube 15. After passing through the tube 15 the liquid passes through a restricted orifice 11. A pipe 14 leads from the entrance side of the restricted orifice 11 to the pressure regulator 6 whereby the variations of pressure intermediate the end of the coil 15 and the orifice 11, which variations are in accordance with variations of viscosity, will effect a movement of the regulator to vary the opening of the valve 5 to admit more or less of the heating medium to the main heater through pipe 4.

According to the first form of the present disclosure, heating medium for heating the viscosity change detector 15 is provided by a pipe 16 shown connected directly to the steam supply pipe 4 at a point intermediate the main heat exchanger and the control valve 5. The pipe 16 delivers steam to a heater shell 17 surrounding the detector coil, from which condensate is discharged by a drain pipe 18. The steam thus supplied serves to rapidly heat up the viscosity change detecting element 15 and the liquid medium passing therethrough and such heating up effect occurs in advance of the heating up of the liquid medium in the main heater 3.

According to the embodiment of the invention shown in Figure 2 the viscosity change detecting device or coil, designated 15a, in place of being provided in a separate heat exchanger, is disposed within the main heat exchanger 3. In this location it is directly susceptible to the heat of the steam supplied to the main heat exchanger.

The viscosity regulator shown in Figure 3 is generally of the form shown in U. S. application to Graham, Serial No. 396,582, filed October 1, 1929. In this embodiment, provision is made for maintaining a constant drop in pressure across the viscosity detecting coil and for securing a variation in the volume of the liquid leaving the viscosity change detecting coil, which variation in volume changes in accordance with variations of viscosity. In this illustration the main heat exchanger is designated 3a and is shown as a straight tubular type of heat exchanger with multiple tubes. Oil or other liquid is admitted at the bottom as before and is led to the point of use via pipe 7. The steam is supplied to the heater through pipe 4 from a valve 5a controlled by a pilot valve 19. At the outlet of the heater a sampling pipe 9 is provided to deliver a small portion of the liquid which has passed through the main heater to a viscosity change detecting or sensing element 15 and therethrough to one side of a diaphragm valve 20. The diaphragm valve 20 has connected thereto upon the opposite side of the diaphragm a suitable pipe 21 which leads back and connects with the sampling pipe 9 in advance of the viscosity change detecting element 15. The function of the valve 20 with its pipe connections as shown is to maintain a constant drop of pressure across the viscosity change detecting coil 15. After leaving the diaphragm valve 20 the medium passes through a knife edged orifice 11. Pipe connections 22 and 23 are provided from opposite sides of the orifice 11 to the diaphragm chamber of the valve 19 and serve to actuate valve 19 in accordance with variations in the volume of the flow of liquid passing the orifice 11. Valve 19 is in the nature of a steam pilot valve for actuating the main steam control valve 5a. Such diaphragm valve 19 may be conveniently provided with a pipe connection 24 leading to the diaphragm chamber of valve 5a and also leading through an orifice 25 after passing which, the pilot steam is delivered back to the main steam supply line 4. The viscosity change detecting coil 15 is provided with a heat exchanger shell 17 receiving steam through a pipe 16 from the steam supply pipe 4 or through a pipe 27, direct from the pilot steam line 24, valves 28, 29, providing for use of either. The drip from this supplementary heater is via pipe 18. Pipe 18 is preferably provided with an orifice 26 to maintain a determined pressure within the heater shell 17.

According to the embodiment of the invention shown in Figure 4 the viscosity change detecting element is disposed directly in the tubular main heater 3a. The viscosity change detecting element may accordingly comprise one of the tubular elements of the heater. This particular element is here designated 15b. The pipe connections are as before, viz. there is a pipe 21 leading from one end of element 15b to the diaphragm chamber of valve 20 and there is a further pipe connection 30 from the other end of the viscosity change detecting element 15b to the valve 20. The orifice 11 and other parts are the same as in the last embodiment.

In the embodiments of the invention shown in Figures 5 and 6, the heater for the sampling liquid is a unit separate and apart from the viscosity change detecting device. In Figure 5, the separate heater 17a is of the box type with overlapping steam heated shelves or "hot plates" 31, projecting from opposite walls and providing a zigzag or tortuous passage for the sample liquid passing to the viscosity sensing tube 15.

The disclosure of Figure 6 differs from that of Figure 5 in the substitution of a filming type of heater in place of the tortuous passage type, the heater disclosed consisting of a thin steam jacketed box 17b proportioned to spread the oil or other liquid in the shape of a slab exposed on all sides to the heating effect.

With the present invention as with previous viscosity regulators, changes in the viscosity of liquid flowing through the viscosity change detecting tube 15, 15a, 15b, will affect the regulator and such changes will cause the regulator to decrease or increase the supply of heating medium to the main heater or main heat exchanger 3, 3a. If the viscosity of the liquid leaving the main heater at pipe 7 is too great, the viscosity regulator will provide for increased supply of steam to the main heat exchanger to relatively lower the viscosity of the liquid passing therethrough. On the other hand if the viscosity of the liquid leaving pipe 7 is relatively too low a reverse action will take place, viz. the supply of heating medium to the main heat exchanger will be cut down.

According to the present invention the viscosity change detecting device is provided with its own heat exchanger controlled in its heating effect in accordance with the viscosity of the tested liquid so that the viscosity regulation may be effected substantially in advance of the change in viscosity of the liquid passing through the main heat exchanger. As shown, the heating medium as supplied to the main heat exchanger is also supplied directly to the heat exchanger of the viscosity change detecting device to heat the latter and the heating of the relatively smaller quantity of liquid in the latter may be effected much more rapidly than the heating of the relatively larger quantity of liquid in the main heater. Accordingly improved viscosity regulation may be obtained. In substance, the actual viscosity regulation is effected in advance of the change in viscosity of the medium in the main heater so that the regulation can be more exact and hunting and the irregular effects existing with previous forms of viscosity regulators may be minimized if not entirely obviated.

The responsiveness of the viscosity regulator to changes in operating conditions may be further improved by the use of the pipe connection 27, Figure 3, in place of the pipe connection 16 since as previously explained the pipe connection 27 receives its steam supply from pipe 24, which in turn takes steam direct from the pilot valve 19. The fluctuations in steam pressure in this pilot valve line are greater than those in the steam line 4, supplying the main heater so that the regulating effects are quicker and the action is in effect amplified.

In some cases, in the actual construction of the viscosity regulators, the viscosity change detecting coil 15, the regulating valve 20, the orifice device 11, the piping 22 and 23 and the pilot valve 19 are assembled in a single unit. In such instances the improved viscosity regulating effects to be obtained by the present invention may be conveniently obtained by housing the entire assemblage of the aforementioned parts or some of them and supplying heat to this housing. In other words, the housing 17 in place of merely enclosing the viscosity element 15 itself may also enclose any or all of the aforementioned parts.

Operation

Steam is supplied to the main heater and to the viscosity change detecting element or the heater for such element, under control of the regulator and the action of the regulator is governed and controlled by changes in viscosity condition of the liquid flowing through said element. When the viscosity of the liquid rises above that for which the viscosity regulator is set, the regulator increases the heat supply for the main heater and viscosity sensing element. The heat transfer for or at the viscosity change detecting element is relatively rapid as compared to the heat transfer at the main heater. The viscosity of the fluid passing through the detecting element lowers ahead of and in fact anticipates the reduction of viscosity of the main body of liquid in the main heater. This reduction of viscosity in the detecting element is utilized immediately for direct control of the regulator to check any further increase in heating effect at the main heater.

Conversely a drop in viscosity below that for which the regulator is set will effect a reduction of the heat supply in the main heater and to the heat exchanger for the viscosity change detecting element. The reduction of heat supply to the viscosity change detecting element will be in advance of and in anticipation of the rise in viscosity of the liquid in the main heater. Accordingly the heating requirements for the main body of liquid which passes through the main heater are promptly met with the attendant elimination of delays in either the decrease or increase of heat supply. Accordingly an improved viscosity regulating action may be secured.

Where the pilot steam supply is utilized for heating the sampling coil or viscosity change detecting or sensing element, the heating effects are supplemented and amplified in extent to further improve the regulating action.

The sampling flow of liquid taken from the main heater is subjected to the same or proportionate heating effects as the liquid in the main heater, but because of the much smaller body the results are more rapid. By utilizing these quicker sensed changes for control purposes, a desired acceleration and amplification of control is effected, leading to more accurate and uniform regulation. In the forms of heaters shown in Figures 5 and 6, the viscosity effect is practically negligible in the heater as the liquid in transit is spread out and the flow is at low velocity. Consequently, the use of this separate heater for the sampling liquid need not alter the viscosity effect of the viscosity sensing tube.

The several embodiments shown make it clear that the heater for the sampling flow may be separate from or part of the main heater and also that the sampling liquid may be heated either before or while passing through the viscosity sensing device. By this invention, the needs for changes in viscosity control are sensed before such needs become apparent in the main body of the liquid and hence the required regulation is put into effect practically in anticipation of the actual need.

What is claimed is:

1. The method of regulating the viscosity of a liquid, which comprises applying heat to such liquid, sampling a small portion of the heated liquid, regulating the heat applied to the liquid in accordance with the viscosity of said sample liquid and applying supplemental regulated heat to said sample liquid to thereby improve and facilitate the regulating effect.

2. A viscosity regulator for liquids, comprising a heat exchanger for the liquid, a device for producing a pressure in accordance with the viscosity of the liquid, a heat exchanger for said last mentioned device, means for conducting liquid leaving the first mentioned heat exchanger through said device and means for utilizing the pressure to regulate the amount of heat supplied to the first mentioned heat exchanger.

3. A viscosity regulator including a heater for liquid, means for controlling the heat exchange by the heater and thereby affecting the viscosity of the liquid passed through the heater, a device sensitive to viscosity for controlling the last mentioned means and means providing for heating of the liquid passing through the last mentioned device during its passage therethrough to produce a change of viscosity of the liquid in said device in advance of the change in viscosity of the liquid passing through the first mentioned heater.

4. The herein disclosed method of regulating viscosity in fluids, which comprises applying heat to flowing fluid and regulating the supply of heat by sampling a small portion of the heated fluid, heating said sample portion proportionately to the heating of the main flow of the fluid and controlling supply of the heating medium by said proportionately heated sample fluid.

5. Viscosity regulation apparatus, comprising a heater for liquid to be regulated, heat supplying means connected therewith and including a variable control device, a sampling member connected to take liquid heated by the heater, a regulator controlled by liquid passed by said sampling member, a heater for said sampling member, operating connections for said variable control device controlled by said regulator for effecting actuation of said variable control device and heat supply connections to said sampling member heater controlled by said regulator to thereby vary the heating of said sampling member.

6. The herein disclosed method of regulating viscosity in fluids, which comprises passing the fluid through a temperature changing zone, sampling the treated fluid and utilizing the sample fluid to control the temperature changing effect on the sampled fluid and subjecting the controlling sample fluid to temperature changing conditions related to but more rapid than those applied to the main body of fluid.

7. Viscosity regulation apparatus, comprising a heater for liquid to be regulated, heat supplying means connected therewith and including a main heat supply controlling valve, a pilot valve governing action of the same and heating medium connections to both said main valve and pilot valve, a viscosity sensing member connected in liquid sampling relation to said heater, heating means for said viscosity sensing member, means governed by said viscosity sensing member to control action of the pilot valve, and heating medium supplying connections from said pilot valve to said heating means for said viscosity sensing member.

8. The herein disclosed method of regulating the viscosity of a liquid, which comprises applying heat to the liquid, sampling a small portion of the heated liquid, regulating the amount of heat applied to the liquid in accordance with the viscosity of said sample liquid and applying amplified heating effects to said sample portion of the liquid, to thereby accomplish control of the heating of the main body of liquid substantially in anticipation of actual requirements.

9. A viscosity regulating apparatus for flowing liquid comprising in combination, a heater for imparting desired viscosity to a liquid, viscosity detecting means responsive to changes in viscosity of the heated liquid for causing said heater to oppose undesired change in the viscosity of the delivered liquid, and viscosity-controlled means including an additional heater affecting the control of said first mentioned heater by said viscosity detecting means for reducing the opposition by the first mentioned heater whereby closer regulation of the viscosity of the delivered liquid is attained.

ERNEST H. PEABODY.
WALTER H. MARTIN.